United States Patent [19]

Jones et al.

[11] 3,998,241
[45] Dec. 21, 1976

[54] SINGLE CONTROL FAUCET

[75] Inventors: Lloyd K. Jones; David A. Yanov, both of Morgantown, W. Va.

[73] Assignee: Elk Manufacturing Company, Inc., Morgantown, W. Va.

[22] Filed: Feb. 6, 1976

[21] Appl. No.: 655,640

[52] U.S. Cl. .......................... 137/454.6; 137/636.1; 137/636.4
[51] Int. Cl.² ......................................... F16K 11/14
[58] Field of Search ...... 137/454.6, 607, 636–636.4

[56] References Cited

UNITED STATES PATENTS

| | | | |
|---|---|---|---|
| 1,095,003 | 4/1914 | Leonard | 137/636.2 X |
| 1,840,961 | 1/1932 | Kuenzler | 137/636.1 X |
| 3,421,540 | 1/1969 | Fulton et al. | 137/454.6 |
| 3,437,112 | 4/1969 | Church | 137/636.2 |

FOREIGN PATENTS OR APPLICATIONS 1,000,371  10/1951  France ............................. 137/607

*Primary Examiner*—Martin P. Schwadron
*Assistant Examiner*—Richard Gerard
*Attorney, Agent, or Firm*—Parmelee, Miller, Welsh & Kratz

[57] ABSTRACT

A faucet for somewhat universal usage is provided with a self-contained, replaceable cartridge unit which has a pair of pin-like valve elements and a hollow cylindrical operating cam for effecting individual and dual control of the opening and closing of a flow through a pair of inlet-seating passages, such as for cold and hot water. The cam is provided with an operating stem and knob for turning it to control the amount of flow from either of a pair of inlets and for moving it longitudinally or axially to further control flow into a mixing chamber and out through a side outlet in the cartridge. The cam may be operated selectively to provide a full or proportionate flow of either hot or cold water or of both of them. The operation of the valve elements is positively guided throughout as controlled by the operating stem and the cam and without the need for spring means or the like. The body of the faucet which may be directly mounted on a tub, sink, wall or other fixture serves to replaceably receive the cartridge which, in addition to the cam and the valve elements, has liquid supply seating passages for the valve elements that are adapted to align with liquid supply passages in the body. The cartridge may be of an inexpensive material, such as a resin, and is mounted in such a manner that it may be easily replaced without dismantling the body or its water connections.

13 Claims, 13 Drawing Figures

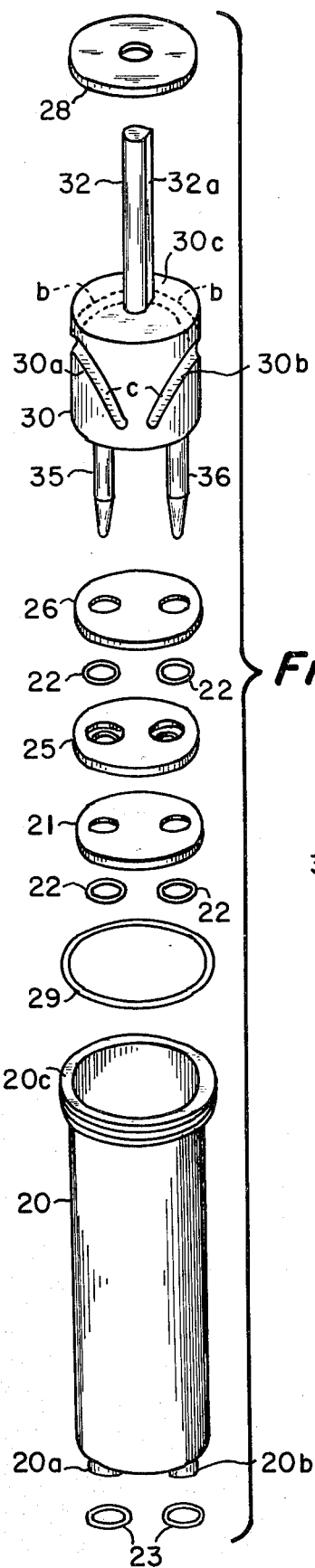
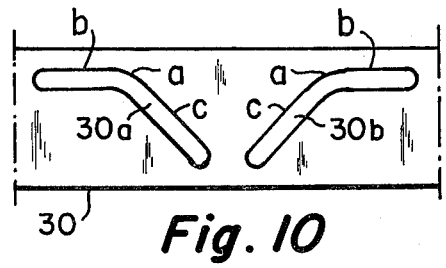
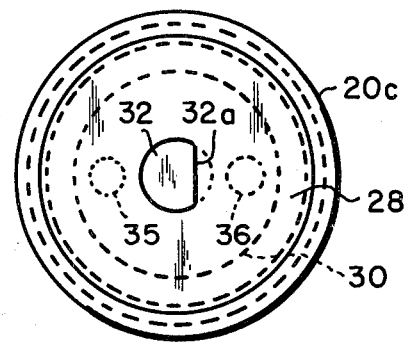
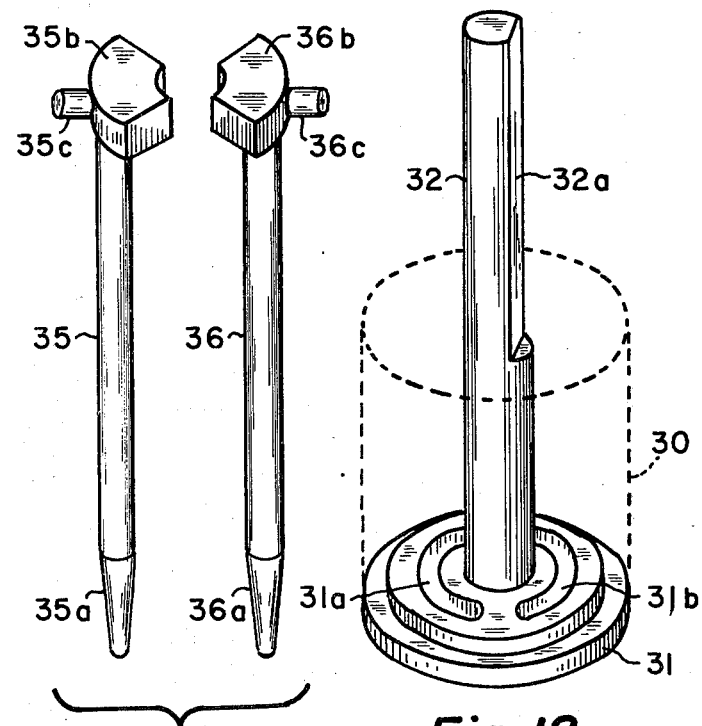

SINGLE CONTROL FAUCET

BACKGROUND OF THE INVENTION

1. Field of the Invention

This invention pertains to a practical, inexpensive, positively acting, improved single control faucet and particularly, to a selectively operative liquid mixing type of faucet whose operating unit is in the form of a cartridge that may be easily replaced.

2. Description of the Prior Art

In an early period, it was customary to provide separate faucets for controlling the flow of water from hot and cold lines. The next development involved the provision of an assembly in which separate operating means would be provided for the hot and cold lines, but the assembly would have a common outlet, in order that a desired mixed temperature, as well as a desired flow of hot or cold water could be supplied as desired. In recent years, the trend has been towards the provision of a faucet unit which not only has a common mixing chamber, but also has a single operating arm or lever for separately controlling the flow of hot and cold water and for providing a desired mixture of the two. Units of this latter type tend to be rather expensive and complicated both in construction and repair. A commonly used type involves the employment of either a solid, cone-like cam or a disc-like cam for separately and simultaneously actuating valve plungers to move them off and on seating positions such that a selective control of water flow may be effected. Valves of this type, in order to be fully positive in their action, have heretofore used spring means for urging individual valves towards a closed or an open position, and have employed cam means to move them towards an opposite position. Such a type of mechanism has entailed considerable wear and tear on the operating parts or elements and, in time, the springs tend to lose their flexibility and to require replacement. The above cam and spring type as well as types using a dual lever system or a tubular, pressure-balanced valve member, all are difficult to repair, thus requiring the services of a skilled person.

There has thus been a need for an improved single operator faucet whose valve elements will be positively actuated in both their closing and opening movements, that will be relatively simple in its construction and maintenance, that will make practical the provision and use of an easily replaceable, inexpensive cartridge operating unit, and that is fully effective in its operation.

SUMMARY OF THE INVENTION

It has thus been an object of the invention to solve the problem hereto involved in the construction and operation of presently available, single lever faucets or water control valve devices.

Another object has been to devise a positively acting long life faucet device whose working parts may be fully carried by and sealed within a replaceable cartridge.

A further object of the invention has been to develop an improved operating cam mechanism for a single, dual-acting valve controlled faucet.

Another object of the invention has been to eliminate the need for non-positive or spring-controlled operations in a single control faucet for providing a desired, hot or cold or mixed temperature outflow from a common chamber.

These and other objects of the invention will appear to those skilled in the art from the illustrated embodiments and the claims.

BRIEF DESCRIPTION OF THE DRAWINGS

In the drawings,

FIG. 9 is an exploded view showing parts or elements of the operating cartridge of the unit of FIG. 1.

FIG. 10 is a development of the operating cam of the device showing the shape of operating slot portions for positively effecting opening and closing movement of rod or pin-like valve elements.

FIG. 11 is a top plan view taken along the line XI—XI of FIG. 6.

FIG. 12 is a vertical view on the scale of FIG. 9, showing construction of the bottom end wall of the housing of the operating cam and curved guide slots therein for permitting free guided turning movement of the operating cam about stem portions of the pin valve elements.

Figure 3:
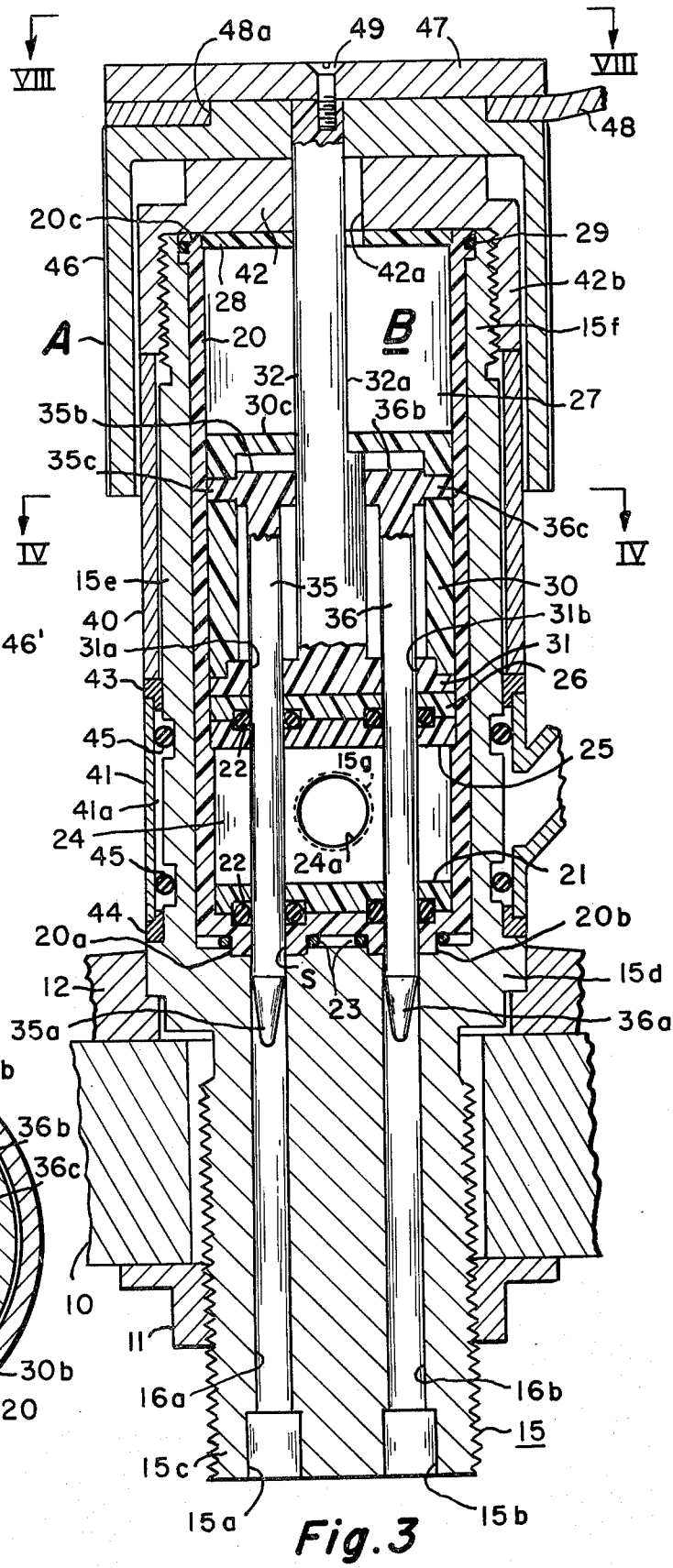
FIG. 3 is an enlarged vertical section showing a device of the invention in an assembled operating position and as mounted to extend longitudinally or forwardly outwardly from a sink, basin, wash bowl, tub or the like; in this view, the valve is shown in a fully closed position from the standpoint of both hot and cold water flow and in which its operating valve pins or rods are in a forward or so-called neutral position, such that a full forward or upward movement of an operating cam therefore may be employed to effect a full, open flow from hot and cold water lines and as illustrated by the position of the valve pins in FIG. 5.

And, FIG. 13 is a vertical perspective view on the scale of FIG. 3 showing details of the construction of pin-like valve elements employed for controlling liquid flow.

DESCRIPTION OF THE PREFERRED EMBODIMENT

Figure 1:
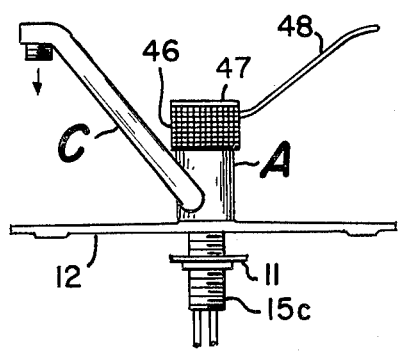
FIG. 1 is a side view in elevation illustrating one representative faucet application of the invention as mounted on a sink or like fixture for controlling flow from hot and cold water supply lines or piping.
Figure 2:
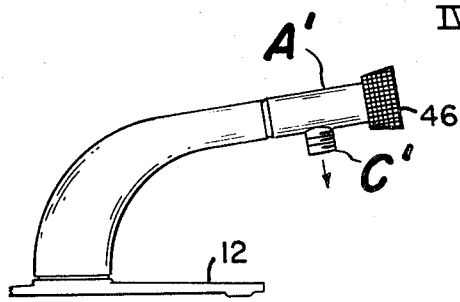
FIG. 2 is a side view in elevation on the same scale as FIG. 1 illustrating a modified application of the invention in which a control device is mounted on the end of, for example, an arm-like swing member or fixture.
Figure 4:
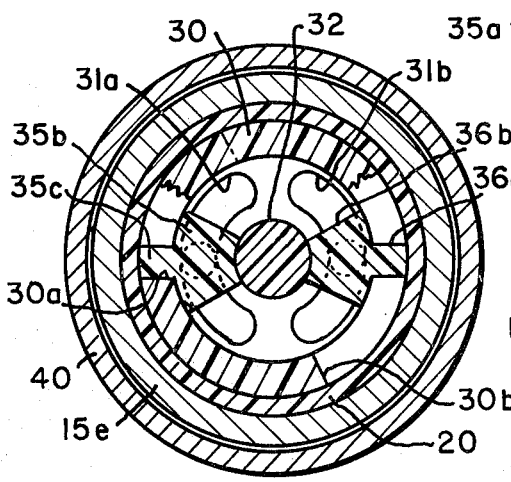
FIG. 4 is a horizontal section on the scale of and taken along the line IV—IV of FIG. 3.

With particular reference to FIGS. 3, 5, 6 and 7, I have shown a faucet device A which has a longitudinally or axially extending mounting body part 15 that is adapted to be positioned to extend from an open portion of a sink, bathtub, wall or other form of supporting mounting or fixture, and that has a cartridge unit B removably enclosed in an operating position within a shell-like, open-end, longitudinally forwardly extending chamber defining wall 15e thereof. A device such as A may, as indicated in FIG. 1, be mounted to extend outwardly from a fixture and employed with a handle 48 and a swingable nozzle C. Another alternative form of mounting is shown in FIG. 2 wherein a faucet, designated as A', is mounted on the end of a spout and is provided with a cone-shaped knob 46' and a short length outlet nozzle or fitting C'.

In FIG. 3, the main body 15 of the faucet has a back end, inner or lower, male-threaded, plug-like mounting portion 15c that is removably secured in position to extend through a mounting hole in a fixture 10. A cover plate or member 12 is shown provided with a stepped inner bore which is complementary and interfits with a stepped outer periphery of an intermediate, annular mounting rim portion 15d of the body 15. An internally threaded mounting nut 11 is adapted to be tightened against the inner side of the fixture 10 by screwing it along externally threaded, mounting, back end portion 15c of the body 15. This tightening-down of the nut 11 is in opposition to the mounting plate 12 in order to securely mount the body 15 between opposite or inner and outer faces of the wall 10.

The back or inner end portion 15c of the body 15 is shown provided with hot water socket 15a and a cold water socket 15b which are adapted to receive the ends of supply piping that may be secured in position, as by cementing or soldering. Flow from the piping (not shown) thus enters a pair of longitudinal flow passageways 16a and 16b which are of a diameter to receive lower tapered or prong-like end portions 35a and 36a of a pair of longitudinally or axially operated rod or pin-like valve elements 35 and 36. The valve elements 35 and 36 are adapted to control liquid flow by cooperating with a pair of aligned seating passageways s that extend through a back wall of a housing 20 of a self-contained cartridge unit B in alignment with a pair of flow passageways 16a and 16b of the body 15. To facilitate control of the amount of water issuing from each passageway, the lower end portions 35a and 36a of the valve pins 35 and 36 are shown shaped in a tapered, converging, somewhat conic form. In this connection, see the effective usage of the pin end portions illustrated particularly in FIG. 7 of the drawings.

The body 15 of the faucet device A has a forwardly or longitudinally extending, cylindrical housing or mounting sleeve portion 15e which extends forwardly from the rim portion 15d, and which, with an externally or male-threaded, open front end portion 15f, defines a cylindrical receiving cavity or chamber for the cartridge unit B.

Longitudinally extending, cylindrical housing 20 of the cartridge unit B defines a lower or rear end mixing and outflow chamber 24 and a forward, cam-operating chamber 27. These two chambers have a sealed-off, separated relation with respect to each other, as accomplished by the use of an intermediate end wall 25 and a cooperating end wall 26 within the cylindrical side wall that may be secured in position, as by cementing. The end wall members 25 and 26 have hole portions for slidably bypassing and guiding the valve pins 35 and 36 therethrough, and have gasket-receiving recesess therebetween for receiving O-rings 22 that, in effect, provide a wiping sealing engagement with the valve elements 35 and 36 during their movement. In this manner, the liquid content of the mixing chamber 24 is sealed-off with respect to the cam-operating chamber 27. As shown particularly in FIGS. 5 and 6, flow from the passageways 16a and 16b is along endwise-aligned seating passageways into the mixing chamber 24 and out through a side port 24a in the wall 20 of the cartridge B and through an aligned port 15g in the body portion 15e into a circumferential, outer, encircling, discharge chamber 41a. The chamber 41a is defined by spacing between the inner wall of an outer enclosing finishing sleeve member 41 and the outer wall of the portion 15e of the body 15. Outflow from the chamber 41a may be effected through a spout-like nozzle C such as shown in FIG. 1, or a spout such as C' shown in FIG. 2.

The cartridge housing 20 has an innermost or back end wall that is provided with a pair of projecting, ring-like portions 20a and 20b that define reinforced valve seating passageways or openings therethrough and which are aligned with similar seating passages or open portions in a reinforcing and supplemental back end wall member 21. The liquid content of the mixing chamber 24 is sealed-off at the back end of the cartridge B by O-rings 22 that are inset in cooperating recess portions between the end wall of the housing 20 and the supplemental back end wall member 21. It will be thus noted that each pin valve element 35, 36 is endwise slidably carried to extend through open hole portions in the members 25 and 26 and through open hole portions in the housing and the supplemental end wall 21 of the cartridge.

Figure 5:
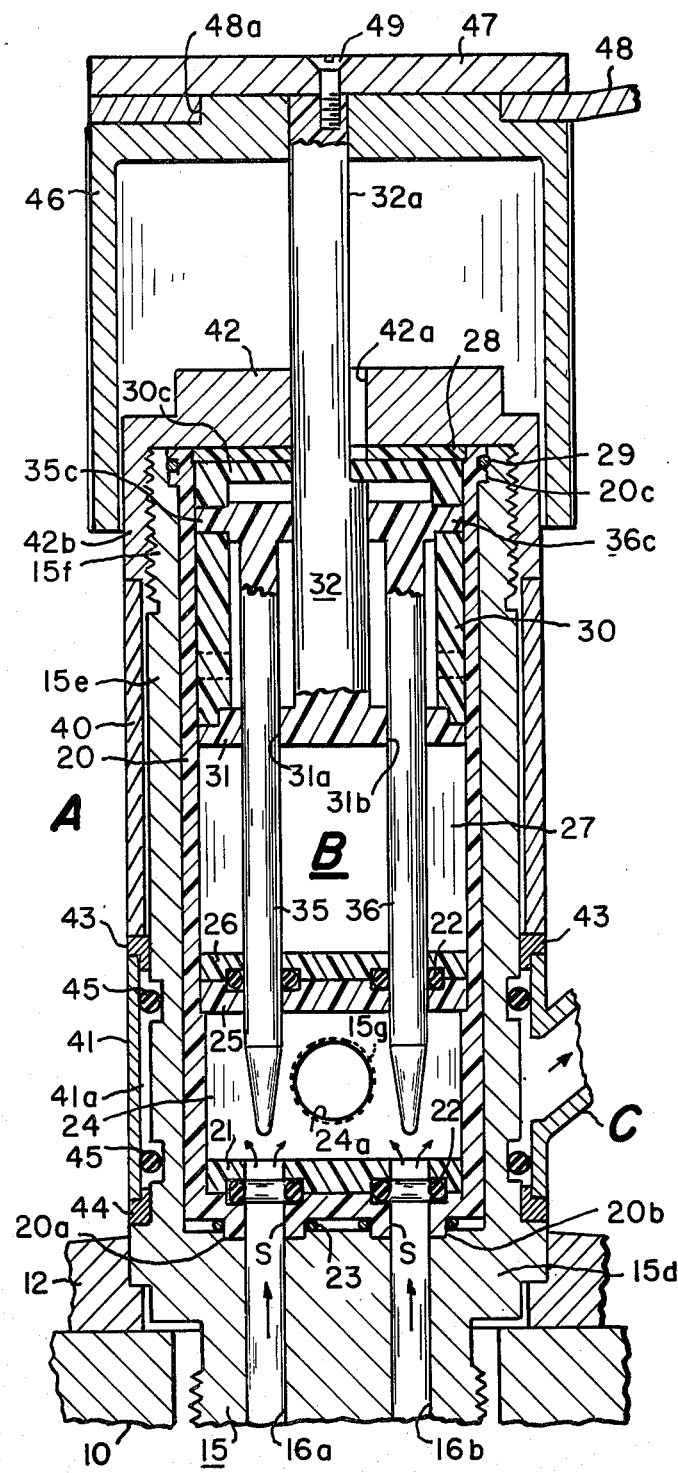
FIG. 5 is a vertical section on the scale of and of the device of FIG. 3, illustrating a fully open position of the mechanism, as effected by raising or moving its operating knob fully forwardly or outwardly to a position at which the operating cam reaches the forward end of is cartridge.
Figure 6:
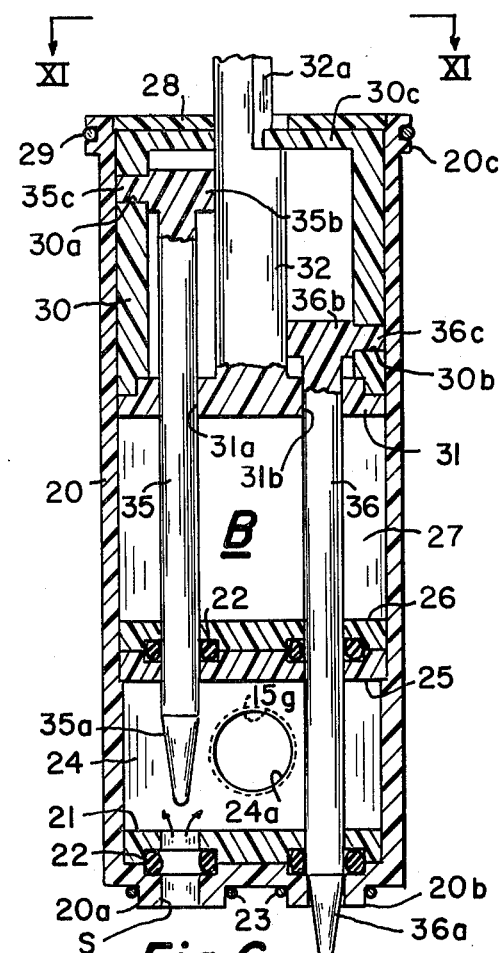
FIG. 6 is a vertical section on the scale of FIGS. 3 and 5, but particularly illustrating the position of pin-like valve elements when the operating cam has been first turned counterclockwise to enable a fully open hot water flow and a full closing-off of cold water flow.

A cylindrical, hollow, operating cam 30 is positioned within the chamber 27 for movement between the innermost or lower position shown in FIG. 3, at which time both valve pins 35 and 36 may be in a fully closed relation with respect to their seating passages, and an uppermost position as shown in FIGS. 5 and 6, in which one or both of the valve pins may be in an open position with respect to their passageway seats. Also, when the cam 30 is in an outermost or top position within the chamber 27, one valve pin such as 35 may be in a lesser opened relation than the other pin 36 (see FIG. 7) to give a desired proportioning of fluid flow into the mixing chamber 24. Although a turning movement of the cam 30 enables a relative adjustment or flow proportioning between the valve pins 35 and 36, the amount of forward axial movement of the cam 30 may be employed to control the total rate of flow from a nozzle C.

The member construction of the elements or parts of the cam assembly 30 is particularly illustrated in FIGS. 9, 10, 11 and 12. The cam 30 has a cylindrical side wall and a closed-off front end wall 30c, as well as a separate but cemented-in-position back end wall 31. A rod-like or cylindrical operating stem 32 projects centrally forwardly as an integral part of the back end wall member 31, through the front end wall 30c to receive an operating knob, such as 46 of FIG. 5 thereon. It will be noted that the uppermost portion of the stem 32 has a flattened or planar side 32a which engages a similar side of the hole through end wall 30c to assure that a turning of the stem will effect a similar turning of the cam assembly 30. Inset, reinforcing, end wall member 28, if of resin material, is cemented in position within the forward end of the housing 20 and has a hole therethrough of a shape that is complementary with the shape of the cylindrical portion of the stem 32.

Opposite sides of the side wall of the cam 30 are provided with a pair of slotted guide parts 30a and 30b each of which has a forward or upper transverse portion b that at one end is connected at a neutral point a with a downwardly or backward sloped portion c. Each slot part 30a and 30b serves as a cam guide for the upper or forward end of an associated valve element 35 and 36. As shown in FIG. 9, each valve element 35 and 36 has a front head or guide ear 35b and 36b from which a cam lug, peg or pin 35c and 36c projects. It will be noted that the ears 35b and 36b on one side have a concave curvature to conform in a complementary manner with the curvature of the stem 32, and on the other side have a convex curvature to conform to the inside of the cylindrical side wall of the cam 30. The lugs 35c and 36c are of rounded contour and are adapted to ride within the slotted parts 30a and 30b (see FIG. 10). When the guide pin portions 35c and 36c are at a so-called neutral position, indicated as a in FIG. 10, both of the valve elements 35 and 36 may be moved from the closed position of FIG. 3 to an open position, such as shown in FIG. 5, by raising or moving the stem 32 forwardly to move the cam 30 from its down or inner position of FIG. 3 to its outer or forward position of FIGS. 5 and 6.

A rotation of the stem 32 in a counterclockwise direction will cause the guide lug 36c to move from the neutral position a in slot part 30b backwardly or downwardly along backwardly inclined portion c, such that a longitudinal or axial forward movement of the cam 30 to a position such as shown in FIGS. 5 and 6 will only result in an opening of the valve element 35 (see FIG. 6), since the rotative movement will cause its guide pin 35c to move along transverse or horizontal upper portion b of the slot part 30a.

Figure 7:
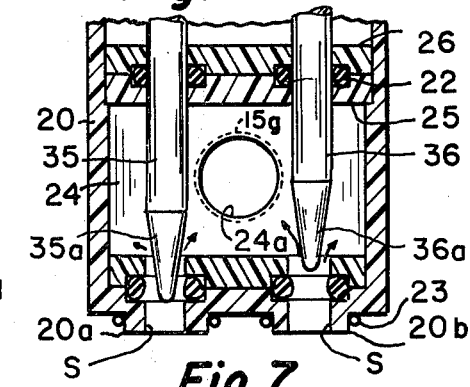
FIG. 7 is a vertical fragmental section on the same scale as FIG. 6, but illustrating the position of valve elements when the operating cam has been first turned a short distance clockwise before it is reciprocated or moved fully axially forwardly to open a proportioned flow through the hot and cold water passageways in such a manner as to provide a greater flow from the cold water passageway.

On the other hand, if the rotation is clockwise, then the guide pin 35c will move from the neutral position a along the down or backwardly inclined portion c in slot part 30a, and the guide pin 36c will move from the netural position a along the substantially horizontal or transverse portion b of the guide slot part 30b. Thus, when the knob 46 is moved outwardly or forwardly to advance the cam 30 to its uppermost or forwardmost position, the valve element 35 may be in a fully closed position and the valve element 36 in a fully open position. When there is only a partial clockwise turning of the cam 30, the pin 35c is not moved to the lowermost part of the portion c but only partially therealong, thus after the stem 32 has been moved forwardly to advance the cam 30 to its outermost position, the position of the valve pins 35 and 36 may be as represented in FIG. 7 in which the greater flow of liquid is through the cold water port and a lesser flow is through the hot water port, assuming that hot water is being supplied to the passageway 16a and cold water is being supplied to the passageway 16b.

The cartridge unit B may be removed from and inserted within the forward, upward or front end of the faucet body 15. It is held in position by a hexagonally shaped, cap-like, mounting end nut 42. The mounting nut 42 has a central hole 42a therethrough of a diameter that corresponds to the full normal cylindrical diameter of the stem 32 to permit its full rotation with respect thereto. As shown particularly in FIGS. 3 and 5, the nut 42 has an internally threaded sleeve portion 42b that is screwed-down over the male threaded portion 15f of body 15 to compressibly hold an outer, sleeve-like assembly of finish members such as 40 and 41 in a securely clamped position along the outside of the body 15. The body of the cartridge housing 20 has a grooved rim portion 20c at its upper end to fit within a recessed portion of the threaded end 15f of the body 15 and to carry a joint sealing O-ring gasket 29. It will be noted that the mounting nut 42 holds the housing 20 securely in position within the cartridge body 15 due to the recessed positioning of the rim portion 20c within its threaded end 15f. Lowermost sleeve-like finish member 41 may be of metal construction and is shown sealed-off at its upper and lower edges by rein, angle-shaped, ring pieces 43 and 44 which, in effect seal-off banding discharge chamber 41a in cooperation with O-ring gaskets 45 that are inset within upper and lower groove portions along the outer side of the wall 15e of the body 15. It will also be noted that O-rings 23 are employed to seal-off the fitted joint relation between the innermost end wall of the cartridge B and the inside of the intermediate rim portion 15d of the faucet body.

Figure 8:
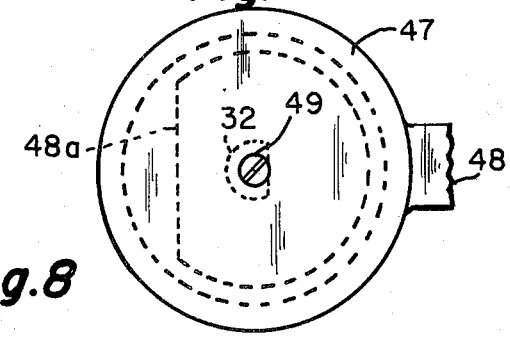
FIG. 8 is a top plan view taken along the line VIII-—VIII of FIG. 1 and on a reduced scale with respect thereto.

The stem 32 may have a knurled knob such as 46 of cylindrical shape or 46' of frustro-conical shape secured thereon by a set screw 49 and an end cap 47. In the embodiment of FIG. 1, the end cap 47, as shown in FIG. 5, serves to clamp a handle 48 about recessed edge portions of the operating knob 46, see also FIG. 8. As indicated, the handle 48 has a circular, centrally open portion that at one side is flattened at 48a to assure that its turning movement will effect a corresponding turning movement of the knob 46. It will thus be apparent that turning movement of the cam 30 may be effected by rotating the knobs 46 or 46', and that reciprocating, back and forth, longitudinal movement of the rod 32 may be effected by either gripping the knobs 46 or 46' or by employing the handle 48 of the embodiment of FIG. 1.

Although, for the purpose of illustration, only a pair of liquid inlets are shown, it will be apparent that an additional inlet or inlets may be provided with an associated valve element and cam slot portions if more than two fluid flow lines are to be handled.

We claim:

1. In a replaceable valve cartridge for use in a fixture-mounted open-end sleeve-like body having a pair of liquid supply passages therein, an elongated cartridge housing adapted to be removably secured within the body to receive hot and cold water therefrom and deliver water of controlled temperature, said housing having a side wall and a back end wall and an intermediate wall that define a mixing chamber, said housing having a front end wall that defines an operating chamber with said side and intermediate walls, said back end wall having a pair of valve seating passages extending therethrough into said mixing chamber and adapted to align with the supply passages in the body to receive hot and cold water therefrom, a pair of pin-like valve elements operatively positioned in said housing to extend backwardly into cooperating opening and closing positions with respect to said valve seating passages for controlling flow of water into said mixing chamber, said pair of valve elements extending forwardly in an endwise-slidable relation through said intermediate wall into said operating chamber, a hollow cylindrical cam positioned for endwise back and forth and for rotative movement within said operating chamber, said cam having a back end portion through which forward end portions of said valve elements extend in a guided relation into and along the interior of said cam, said cam having a guide slot part for each of said valve elements in its side wall, each of said valve elements having an operating lug extending transversely from its forward end portion into a cooperative guided relation within an associated one of said guide slot parts, an operating stem extending forwardly from said cam for rotating said cam to advance said slot parts with respect to said lugs for adjusting the relative longitudinal positions of said valve elements with respect to each other and with respect to said seating passages, and said stem being adapted to move said cam longitudinally for moving said valve elements with respect to the associated seating passage.

2. In a replaceable valve cartridge as defined in claim 1, said housing having a side delivery port open therethrough from said mixing chamber.

3. In a replaceable valve cartridge as defined in claim 1, guide means for said valve elements at the back end of said cam comprising, an end wall having a pair of curvilinear slots therein through each of which an associated one of said valve elements extends to permit rotation of said cam with respect to said valve elements.

4. In a replaceable valve cartridge as defined in claim 1, each of said valve elements having a guide ear at its forward end that has a concave inner side curvature to conform with the curvature of said operating stem and that has an outer convex side curvature to conform to the inner curvature of the side wall of said cylindrical cam, and each of said operating lugs extending transversely outwardly from the convex side of an associated one of said guide ears.

5. In a replaceable valve cartridge as defined in claim 1, each of said guide slot parts having a forward transversely extending portion and a connecting backwardly sloped portion, whereby a clockwise rotation of said cam will effect movement of one of said operating lugs along the transverse portion of an associated one of said slot parts to maintain the associated one valve element in a stationary position, and whereby the operating lug of the other of said valve elements will move backwardly along the sloped portion of its associated slot part to move said other valve element backwardly with respect to its associated seating passage, and whereby the operation will be reversed with a counterclockwise rotation of said cam to move said one valve element backwardly along its associated seating passage.

6. In a replaceable cartridge as defined in claim 1, said operating stem exending from said back end wall forwardly through said front end wall of said cam along said operating chamber and out through a front end of said cartridge housing, the back end wall of said cam having a pair of opposed curvilinear slot portions extending transversely thereof and through which said valve elements extend to permit relative rotation of said cam with respect to said valve elements, each of said valve elements having a segment-like ear on its forward end, each said ear having a complementary interfitting positioning between said stem and the inside of the side wall of said cam for guiding rotative and back and forth movement of said cam with respect thereto, each of said operating lugs projecting transversely from an associated one of said ears, each side guide slot part of said cam having a forwardly positioned transversely extending slot portion and a connected backwardly sloped portion within which the associated operating lug is adapted to move, the slot portion arrangement being such that one direction of rotation of said cam will advance one of said valve elements backwardly along the sloped portion of an associated slot part and an opposite direction of rotation of said cam will advance the other of said valve elements along the sloped portion of its associated slot part.

7. In a single control faucet for mounting on a fixture, an elongated mounting body adapted to be secured to extend from the fixture and having a pair of hot and cold water supply passages extending from a back end portion thereof, a valve cartridge having an elongated housing, means for removably securing said cartridge in an operating position within said body, said housing having an intermediate and a back end wall defining a mixing chamber therein, said cartridge having a pair of passages adapted to align with forward ends of the pair of passages in said body to receive liquid therefrom and define a pair of flow passages therewith to said mixing chamber, a shell-like cam operatively positioned for rotative and reciprocating movement within a forward end portion of said cartridge, a pair of pin-like valve elements operatively extending at their forward ends into said cam and backwardly into a cooperative seating alignment with said pair of flow passages; said cam and forward end portions of said pair of valve elements having cooperating lug and guide slot parts to individually, on rotative movement of said cam, advance and retract each of said valve elements with respect to said pair of flow passages for controlling the volume of flow through each of said flow passages; and operating means for moving said cam longitudinally back and forth within said housing for moving said valve elements axially with respect to said pair of flow passages to control flow therethrough into said mixing chamber in accordance with adjustments made by rotative movement of said cam.

8. In a single control faucet as defined in claim 7, an operating stem carried by said cam and having an outer portion extending through a forward end of said cartridge, and said operating means being mounted on the outer portion of said stem for selectively rotating said cam within said cartridge and for moving it backwardly and forwardly within said cartridge.

9. In a single control faucet as defined in claim 8, said operating means being a knob secured on the outer portion of said stem, an end nut adapted to be threadably positioned on the forward end of said body for mounting said cartridge therewithin, and said knob extending in an encircling relationship with respect to and about said end nut.

10. In a single control faucet as defined in claim 7, said lug and guide slot parts comprising, an inclined slot portion along one side wall of said cam, a second inclined slot portion along an opposite side wall thereof, a cam lug extending from the forward end of each of said valve elements, one of said lugs being operatively mounted for positively guided movement along one of said inclined slot portions when said cam is rotated in one direction, and the other of said lugs being operatively mounted for positively guided movement along the other of said inclined slot portions when said cam is rotated in an opposite direction.

11. In a single control faucet as defined in claim 10, each said guide slot part having a forwardly positioned substantially transverse slot portion connected to said inclined slot portion, the lug of one of said valve elements being adapted to move along an associated transverse slot portion when the lug of the other of said valve elements is being moved along its associated inclined slot portion by rotation of said cam in one direction, and the lug of the other of said valve elements being adapted to move along its associated transverse slot portion when the lug of the one of said valve elements is being moved along its associated inclined slot portion by rotation of said cam in an opposite direction.

12. In a single control cartridge as defined in claim 7, an outlet port in said housing extending from said mixing chamber, an outlet port through said mounting body in alignment with the outlet port of said housing to receive liquid from said mixing chamber, a finish assembly extending along and about said mounting body to enclose it, a lower portion of said finish assembly defining an outlet chamber about said mounting body in alignment with said outlet port therein, and a delivery fixture extending from said outlet chamber and carried by an adjacent portion of said finish assembly.

13. In a single control faucet for mounting on a fixture and having an elongated body provided with at least a pair of separate inlet passageways at its back end and a forwardly extending and open shell-like portion defining an elongated chamber therein, an operating cartridge adapted to be positioned within the elongated chamber, means for closing-off the forward end of the body and for removably retaining said cartridge within the shell-like portion thereof, said cartridge having a cylindrical housing provided with walls defining a backwardly positioned mixing chamber and a forwardly positioned operating chamber, an output port extending through said housing from said mixing chamber, at least a pair of pin-like valve members operatively carried within said cartridge for non-turning longitudinal movement therewithin, a pair of seating passages at the rear end of said cartridge adapted to align with said inlet passages of said body, said valve members having prong-shaped back end portions adapted to move into and out of a seating position with respect to said seating passages, a cylindrical-like cam operatively positioned within said operating chamber for rotative and reciprocating movement therewithin, a stem secured to extend from said cam through a front end wall of said cartridge for rotating and for reciprocating said cam within said operating chamber;

said cam having a pair of opposed side guide parts in its side wall for, on rotation of said cam, positively separately moving each of said valve members in an axial direction with respect to said seating passageways to adjust flow of liquid into said mixing chamber, and said cam being adapted to be moved longitudinally within said cartridge to simultaneously move said valve members in their respective adjusted positions longitudinally of said seating passages.

* * * * *